United States Patent [19]

Ford

[11] 4,362,295

[45] Dec. 7, 1982

[54] LOG HOLDING DEVICE

[76] Inventor: Henry E. Ford, 381 Highland Rd., Macedonia, Ohio 44056

[21] Appl. No.: 260,082

[22] Filed: May 4, 1981

[51] Int. Cl.³ .............................................. B23Q 1/04

[52] U.S. Cl. ...................................... 269/69; 269/287; 269/296; 269/901

[58] Field of Search .................... 269/88, 296, 901, 17, 269/69, 287; 248/165, 176; 182/224–227, 151; 254/8 B

[56] References Cited

U.S. PATENT DOCUMENTS

| | | | |
|---|---|---|---|
| 1,798,340 | 3/1931 | Thewes | 269/296 X |
| 2,490,858 | 12/1949 | Deddo | 269/296 X |
| 2,709,384 | 5/1955 | Harris | 269/296 |
| 2,885,165 | 5/1959 | Smolen | 269/296 |
| 2,903,258 | 9/1959 | Jovanovich | 248/176 X |
| 3,931,956 | 1/1976 | Hawkins | 254/8 B |
| 4,195,828 | 4/1980 | Peterson | 269/287 X |
| 4,241,772 | 12/1980 | Scherer | 248/176 X |
| 4,258,907 | 3/1981 | Roberts et al. | 269/69 |

*Primary Examiner*—Robert C. Watson

*Attorney, Agent, or Firm*—Oldham, Oldham, Hudak & Weber Co.

[57] ABSTRACT

A device for securing logs or flat work while said logs or flat work are being cut out of doors in situ. The device consists of a stand and a bow section mounted on a base which secures the log on flat work by means of judicious use of their center of gravity. The device may be adaptable to a wide variety of sizes of logs or flat work and is portable. In one embodiment, the device is constructed of metal pieces having hollow circular cross-sectional areas allowing the base and the stand sections to telescope by means of concentric sections, thus fullfilling the requirement of adaptability described herein.

4 Claims, 3 Drawing Figures

LOG HOLDING DEVICE

TECHNICAL FIELD

The invention herein lies in the art of log holding devices. More paticularly, the invention can secure a log off the ground in a horizontal position in order to facilitate sawing of the log. The invention may be utilized by one person, is portable, and may be assembled from its collapsed position and used out of doors in situ. The invention is adaptable to a wide range of logs and may also be used to secure pre-cut wooden boards or poles for further cutting.

BACKGROUND ART

The prior art in the area of log holding devices is surprisingly sparse. A partial explanation may lie in the belief that merely propping the log against a rock or another log or using a saw horse was the best that technology had to offer as an aid to log cutting. Indeed, often times these methods are adequate for securing the log while cutting However, they are not without their difficulties. The log may easily slip off the rock or the saw horse if adequate precautions are not taken, such as placing one's foot upon the lower end of the log or having another person hold one end of the log. Even then the log may slip. This can prove especially hazardous when a motorized chain saw is used as the cutting tool. Furthermore, there is oftentimes difficulty in cutting the last section of log in two because of its relatively short length. Akin to this is the problem that the last section of log, which has been sitting on the ground, has accumulated a considerable amount of mud or dirt on its outer surface.

Hence, there is a need in the art for a device which will secure the log being cut off the ground in a horizontal position so as to keep the log free of dirt and mud, which does not require the active services of the wood cutter or another, and which is portable, in that it may be assembled and used in the field.

DISCLOSURE OF INVENTION

In light of the foregoing, it is an object of the instant invention to provide a log holding device which is adaptable to log sizes ranging from 1" to 1½' in diameter and up to 15' or more in length.

It is another object of the invention to provide a log holding device which will secure the log off the ground in a horizontal position at a height which is convenient to the wood cutter and thereby prevent contamination with dirt or mud.

A further object of the invention is to provide a wood holding device which will secure the log without the active assistance of the wood cutter or another person.

Still an additional object of the invention is to provide a log holding device which is portable and thus may be set up and used in the field where the wood is gathered.

Yet another object of the invention is to provide a log holding device which may be adaptable for use in holding flatwork such as pre-cut boards or poles for further cutting.

The foregoing and other objects of the invention which will become apparent as a detailed description proceeds are achieved by: a log holding device comprising a telescoping base to which is attached a bow and a yoke of adjustable height upon which rests the log or board to be cut.

BRIEF DESCRIPTION OF DRAWINGS

For a complete understanding of the objects, techniques, and structure of the invention, reference should be had to the following detailed description and accompanying drawings wherein.

BEST MODE FOR CARRYING OUT THE INVENTION

Figure 1:
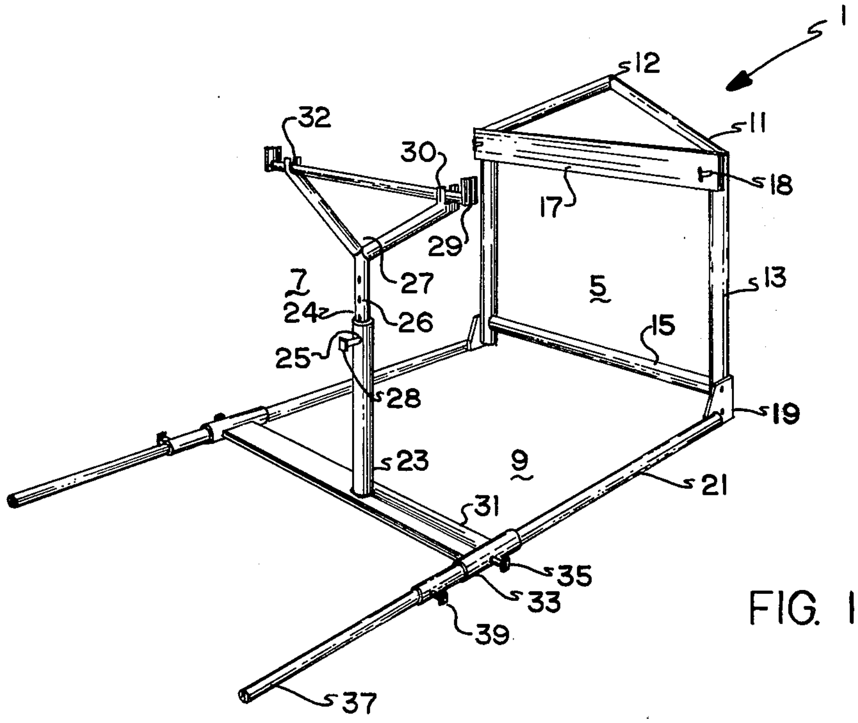
FIG. 1 is an isometric view of the log holding device showing the overall construction and appearance.

Referring now to the drawings and more particularly to FIG. 1, it can be seen that a log holding device made according to the teachings of the invention is designated generally by the number 1. The device consists of three general parts: the bow generally 5, the stand generally 7 and the base generally 9. Because of the requirement that the device be able to support heavy logs, the entire construction is of metal, viz., iron, aluminum, steel or other suitably sturdy material. The structural members, such as diagonal members 11, vertical members 13, bow crossmember 15, and base members 21 may be composed of angle iron, tubing or the like, with tubing being preferred. FIG. 1 illustrates the use of tubing for said structural members. The diagonal members 11, vertical members 13 and bow crossmember 15 are secured to one another by welding or, if the construction is of pipe, they may be secured by threading their ends and using appropriate pipe fittings.

In FIG. 1 is illustrated the use of the flat work insert 17. This appurtenance, along with the flat work yoke cradle 29 described in detail hereinbelow, are used only when a flat piece of material such as a board is cut. When the device is used to cut logs having a circular cross-section, these two devices are removed. The flat work insert 17 is also constructed of metal or other appropriate material and is attached to vertical members 13 by means of insert securing pins 18 which pass through aligned holes in both pieces. The bow 5 is attached to the base 9 by means of the bow hinging mechanism 19.

Figure 2:
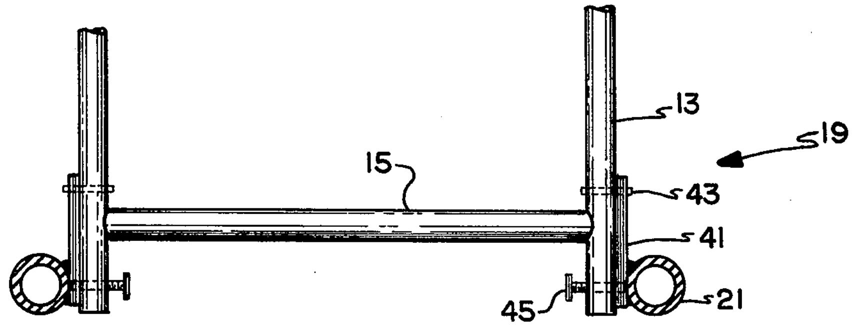
FIG. 2 is an end view of the bow showing the hinging mechanism.
Figure 3:
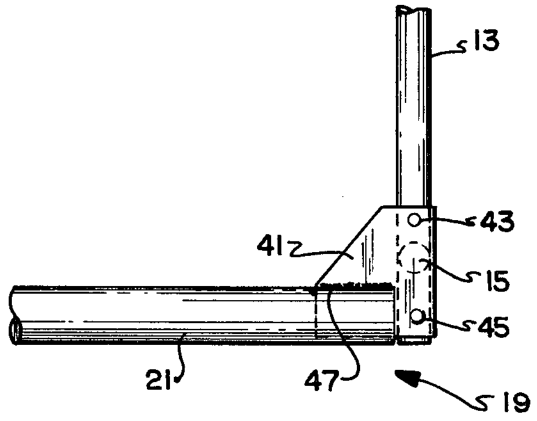
FIG. 3 is a side view of the base showing the hinging mechanism.

Turning now to FIG. 2 and FIG. 3 it is noted that a bow hinging mechanism is designated generally by the number 19 and consists of three parts, namely, a hinge base plate 41, a pivot hinge 43, and a hinge locking pin 45. The hinge base plate 41 is welded to the base member 21 in area 47. The vertical members 13 are secured to the hinge base plate 41 by means of the pivot hinge 43, which is a dowel allowing the vertical members 13 to swing freely into a horizontal position when not in use. When in the vertical position, the vertical members 13 are further secured to the hinge base plate 41 by means of the hinge locking pins 45, which pass through both the vertical member 13 and the hinge base plate 41 to secure the former thereon. Thus, the dual objective is met of providing a secure structure when in use and a compact, portable structure during transport and storage.

Returning now to FIG. 1, it is appreciated that the base 9 can be extended to any given length by adjusting the telescoping base section 37. When the desired length is reached, the set screw 39 is tightened, thus providing a rigid base support. When not in use, the telescoping base section 37 is withdrawn into the base member 21 thereby providing a more compact overall device. It is appreciated further that the base may be constructed of angle iron or other material not of hollow circular construction and the same effect may be achieved.

In similar fashion, the stand 7 may thereby be made adjustable. The stand positioner 33, constructed of a hollow tube of circular or other cross-section is fully moveable over the base member and the telescoping base section. By such means, the stand 7 may be positioned at any point along the base 9. The stand cross member 31, also constructed of hollow tubing or the like, is attached to the stand position 33 by welding or other suitable means. Once the stand 7 is positioned along the length of the base 9 to accomodate a given length of log, the stand positioners are secured on the base members 21 or the telescoping base sections 37 by means of the set screws 35.

At the midpoint of the stand cross member 31 one finds the outer stand member 23, which is positioned vertically to the stand cross member 31. It will be appreciated by one skilled in the art that, at the juncture of the stand cross member 31 and the outer stand member 23, there can be located a device analogous to the bow hinging mechanism 19 wherein the stand 7 may be collapsed into the base 9.

The outer stand member 23 is a hollow metal cylinder on the inner diameter of which is inserted the inner stand member 24. The inner stand member 24 contains a series of adjustment holes 26, which operate in a manner similar to that of commonly known jack stands wherein the height of the stand 7 is determined by which of the adjustment holes 26 are lined up with the outer stand adjustment hole 25. For a given desired height, the corresponding adjustment hole 27 is aligned with, and secured to, the outer stand adjustment hole 25, by means of the stand adjustment pin 28. Thus, a rigid stand capable of supporting a considerable amount of weight is thereby produced.

When a log is being cut, the yoke 27 is used to support one end of the log, which rests in the Y-shaped cradle. When flat work such as a board or pole is being cut, the flat work yoke cradle 29 is attached to the yoke 27 by means of the yoke cradle securing pins 30. These securing pins 29 align the flat work yoke cradle 29 with the yoke 27 by passing through holes aligned at appropriate locations on both the flat work yoke cradle 29 and the yoke 27. In use, the invention is carried into the field in its collapsed state, wherein it consists of two pieces, (1) the stand 7, and (2) the bow 5 and base 9 as one unit. Optionally, the first work insert 17 and the flat work yoke cradle 29 may also be attached to their respective members. The bow is folded down upon the base 9 by means of the bow hinging mechanism 19. The telescoping base sections 37 have been fully retracted into the base members 21 so as to provide a very compact unit.

When the wood cutter has arrived at the work location, he raises the bow 5 and locks it in place by means of the bow hinging mechanism 19, securing it by means of the hinge locking pin 45. This procedure is performed on both sides of the base 9. The stand positioners 33 are then placed over the base members 21 and secured in place by means of the set screws 35. Before so attaching these stand positioners 33 it may be necessary to remove the set screws 39 which secure the telescoping base sections 37. Alternatively, the stand 7 may possess a hinging mechanism as described above, in which case the stand 7 is merely raised and locked in place in similar fashion to the bow 5. In any event, the positioning of the stand 7 along the base 9 is determined by the length of the log or the flat work to be cut. In particular, the center of gravity of the log or flat work must be on that side of the stand opposite that of the bow 5.

Thus, when a log is placed in the yoke 27, the end of the log at the bow section tends to rise until it touches the bow apex 12, whereupon its further progress is halted. In anticipation of this tilting from the horizontal, the thinner stand member 24 is adjusted in height so that when the log or flat work is placed in the yoke 27 or the flat work yoke cradle 29, respectively, said piece is as nearly horizontal as possible when its end is resting in the bow. In such position, the log or flat work is secured rigidly in place, due to the force of gravity pressing down upon the yoke 27, which acts in the manner of a fulcrum, and up upon the bow apex 12. For very long logs or flat work, the telescoping base sections 37 may be extended as far as is necessary to produce a stable base 9. They are secured by the set screws 39 on either base members 21.

The end of the log or flat work opposite that of the bow 5 is the end which is cut. As that end of the log or flat work is successively shortened, the center of gravity will necessarily shift. Should the center of gravity shift to the bow side of the stand 7, the log will dislodge itself and the utility of the invention will be lost. To circumvent this, after successive pieces are cut from the log, the stand 7 is moved progressively towards the bow 5, each successive move entailing the loosening of the set screws 35, moving the stand 7, and then tightening the set screws 35 at the new position. In such manner, even very short pieces of log or flat work may be thus cut.

When flat work, such as a length of board or pole is cut, the flat work yoke cradle and the flat work insert are positioned and secured as described hereinabove. The device is operated in similar fashion to that of log cutting, except that instead of the flat work resting in the bow apex 12, it now rests beneath the flat work insert 17. The necessary lateral securement of the flat work is achieved by means of the yoke cradle struts 32, which hold the ends of the flat work in place.

Thus it can be seen that the objects of the invention have been satisfied by the structure presented hereinabove. The concept of the invention is applicable to both a log of circular cross-section and to flat work such as board. While in accordance with the Patent Statutes, only the best mode and preferred embodiment of the invention has been presented and described in detail, it is to be understood that the invention is not limited thereto or thereby. Accordingly, for an appreciation for the true scope and breadth of the invention, reference should be had to the appended claims.

What is claimed is:

1. A log securing device, comprising:

a base of adjustable length, said base comprising a pair of longitudinally extending parallel members;

a stand, adjustably movable upon and extending normal to said base, said stand comprising a V-shaped yoke at a top end thereof and telescoping sections for selective vertical extension; and a bow, received at an end of said base in alignment with said stand, said bow comprising an inverted V-shaped brace at a top end thereof.

2. The log securing device according to claim 1 wherein said bow is adapted to receive a first flat support piece thereacross and beneath said brace, and said stand is adapted to receive a second flat support piece above said yoke, said first and second flat support pieces being maintained in substantial alignment.

3. A log securing device, comprising:

a telescopic base, said base comprising a pair of longitudinally extending parallel members;

a stand, adjustably movable upon and extending normal to said base, said stand comprising telescoping sections for selective vertical extension; and a bow received at an end of said base in alignment with said stand, said bow being pivotally secured to an end of said base and foldable upon said base.

4. The log securing device according to claim 3 wherein said stand is removable from said base.

* * * * *